(12) United States Patent
Niki et al.

(10) Patent No.: US 6,185,948 B1
(45) Date of Patent: Feb. 13, 2001

(54) REFRIGERATOR FREEZER WITH TWO EVAPORATORS FOR RESPECTIVE REFRIGERATING AND FREEZING COMPARTMENTS

(75) Inventors: Shigeru Niki; Atsushi Kusunoki; Takuya Kishimoto, all of Ibaraki (JP)

(73) Assignee: Kabushiki Kaisha Toshiba, Kawasaki (JP)

( * ) Notice: Under 35 U.S.C. 154(b), the term of this patent shall be extended for 0 days.

(21) Appl. No.: 09/410,038

(22) Filed: Oct. 1, 1999

(30) Foreign Application Priority Data

Oct. 2, 1998 (JP) .................................................. 10-281560

(51) Int. Cl.[7] ................................. F25B 5/00; F25B 39/00
(52) U.S. Cl. ................................................ 62/199; 62/524
(58) Field of Search .............................. 62/199, 179, 524

(56) References Cited

U.S. PATENT DOCUMENTS

| 4,242,116 | 12/1980 | Aschberger et al. | 62/199 |
| 4,439,998 | 4/1984 | Horvay et al. | 62/199 |
| 5,272,884 | * 12/1993 | Cur et al. | 62/199 |
| 5,465,591 | 11/1995 | Cur et al. | 62/439 |
| 5,715,693 | 2/1998 | van der Walt et al. | 62/198 |
| 6,016,662 | * 1/2000 | Tanaka et al. | 62/199 |

FOREIGN PATENT DOCUMENTS 0 246 465   11/1987   (EP) .

* cited by examiner

*Primary Examiner*—William Wayner
(74) *Attorney, Agent, or Firm*—Pillsbury Madison & Sutro LLP

(57) ABSTRACT

A refrigerator-freezer includes a first evaporator cooling an atmosphere in a refrigerating compartment, a second evaporator cooling an atmosphere in a freezing compartment and a controller controlling a switching valve in a refrigerating cycle so that a cooling operation is switched between a first operation mode in which refrigerant compressed by a compressor is supplied at least to the first evaporator and a second operation mode in which the refrigerant compressed by the compressor is supplied at least to the second evaporator. The controller stops the compressor when a temperature in either one of the refrigerating and freezing compartments for which the cooling operation is unexecuted is below a predetermined upper limit temperature in a case where a temperature in the other compartment for which the cooling operation is in progress drops to a predetermined lower limit temperature.

11 Claims, 3 Drawing Sheets

US 6,185,948 B1

REFRIGERATOR FREEZER WITH TWO EVAPORATORS FOR RESPECTIVE REFRIGERATING AND FREEZING COMPARTMENTS

BACKGROUND OF THE INVENTION

1. Field of the Invention

This invention relates to a refrigerator-freezer provided with two evaporators, that is, a first evaporator for cooling an atmosphere in a refrigerating compartment and a second evaporator for cooling an atmosphere in a freezing compartment.

2. Description of the Prior Art

There have conventionally been provided refrigerator-freezers in which a liquid refrigerant having passed through a compressor and a condenser is further supplied to an evaporator to be evaporated such that the evaporator is cooled. A cold air produced by the evaporator is supplied to a freezing compartment by a blower so that an atmosphere in the freezing compartment is cooled and so that the cold air is also supplied to a refrigerating compartment via a damper so that an atmosphere in the refrigerating compartment is cooled. When a temperature in the refrigerating compartment drops to a lower limit temperature (for example, 1° C.), the damper is closed so that the supply of cold air to the refrigerating compartment is interrupted. When the temperature in the refrigerating compartment increases to an upper limit temperature (for example, 5° C.), the damper is opened so that the supply of cold air to the refrigerating compartment re-started. As a result, the temperature in the refrigerating compartment is controlled so as to be maintained at a predetermined temperature (for example, 3° C.). Further, the operation of the compressor is stopped when a temperature in the freezing compartment drops to a lower limit temperature (for example, −22° C.). The operation of the compressor is re-started when the temperature in the freezing compartment increases to an upper limit temperature (for example, −18° C.). As a result, the temperature in the freezing compartment is controlled so as to be maintained at a predetermined temperature (for example, −20° C.).

In the above-described refrigerator-freezer, however, the operation of the compressor is automatically stopped when the temperature in the freezing compartment drops to the lower limit temperature as described above. Accordingly, the operation of the compressor may be stopped even when the temperature in the refrigerating compartment is relatively high. In such a case, when the temperature in the freezing compartment thereafter increases to the upper limit temperature such that the operation of the compressor is re-started, the temperature in the refrigerating compartment exceeds the upper limit temperature. Accordingly, thereafter, it takes a lot of time for each of the temperatures in the respective refrigerating and freezing compartments to drop to the corresponding preset temperature. This results in a reduction in the operating efficiency of the compressor, whereupon food cannot be cooled efficiently.

SUMMARY OF THE INVENTION

Therefore, an object of the present invention is to provide a refrigerator-freezer which comprises a first evaporator for cooling the atmosphere in the refrigerating compartment and a second evaporator for cooling the atmosphere in the freezing compartment so that an operating efficiency of the compressor can be improved.

The present invention provides a refrigerator-freezer comprising a refrigerating compartment, a freezing compartment, a refrigerating cycle including a compressor compressing a refrigerant, a condenser condensing the refrigerant supplied from the compressor, a first evaporator cooling an atmosphere in the refrigerating compartment, a second evaporator cooling an atmosphere in the freezing compartment, and a valve switching a cooling operation between a first operation mode in which the refrigerant compressed by the compressor is supplied at least to the first evaporator and a second operation mode in which the refrigerant compressed by the compressor is supplied at least to the second evaporator, and a controller controlling the compressor and the valve, the controller controlling the valve so that the first and second operation modes are carried out alternately, the controller stopping the operation of the compressor when a temperature in either one of the refrigerating and freezing compartments for which the cooling operation is unexecuted is below a predetermined upper limit temperature in a case where a temperature in the other compartment for which the cooling operation is in progress drops to a predetermined lower limit temperature.

According to the above-described refrigerator-freezer, the controller stops the operation of the compressor when a temperature in either one of the refrigerating and freezing compartments for which the cooling operation is unexecuted is below a predetermined upper limit temperature in a case where a temperature in the other compartment for which the cooling operation is in progress drops to a predetermined lower limit temperature. The temperature in the refrigerating or freezing compartment for which the cooling operation is unexecuted is sufficiently low when the compressor is stopped. Accordingly, the temperature in the refrigerating or freezing compartment for which the cooling operation is unexecuted can be prevented from being excessively increased until the operation of the compressor is re-started. Consequently, the operating efficiency of the compressor can be improved.

In a preferred form, the controller controls the compressor so that a performance of the compressor is varied, and the controller stops the operation of the compressor when the compressor is at a lowest performance and the temperature in the compartment for which the cooling operation is unexecuted is below the predetermined upper limit temperature in a case where the temperature in the compartment for which the cooling operation is in progress drops to the lower limit temperature.

In another preferred form, the controller switches the cooling operation to the second operation mode when a temperature in the refrigerating compartment drops to a predetermined lower limit temperature while the cooling operation is under performance in the first operation mode and thereafter, the controller stops the compressor when a temperature in the freezing compartment drops to a predetermined lower limit temperature and the temperature in the refrigerating compartment is below a predetermined upper limit temperature while the cooling operation is in progress in the second operation mode.

BRIEF DESCRIPTION OF THE DRAWINGS

Other objects, features and advantages of the present invention will become clear upon reviewing the following description of the preferred embodiments, made with reference to the accompanying drawings, in which.

DETAILED DESCRIPTION OF THE PREFERRED EMBODIMENT

Figure 1:
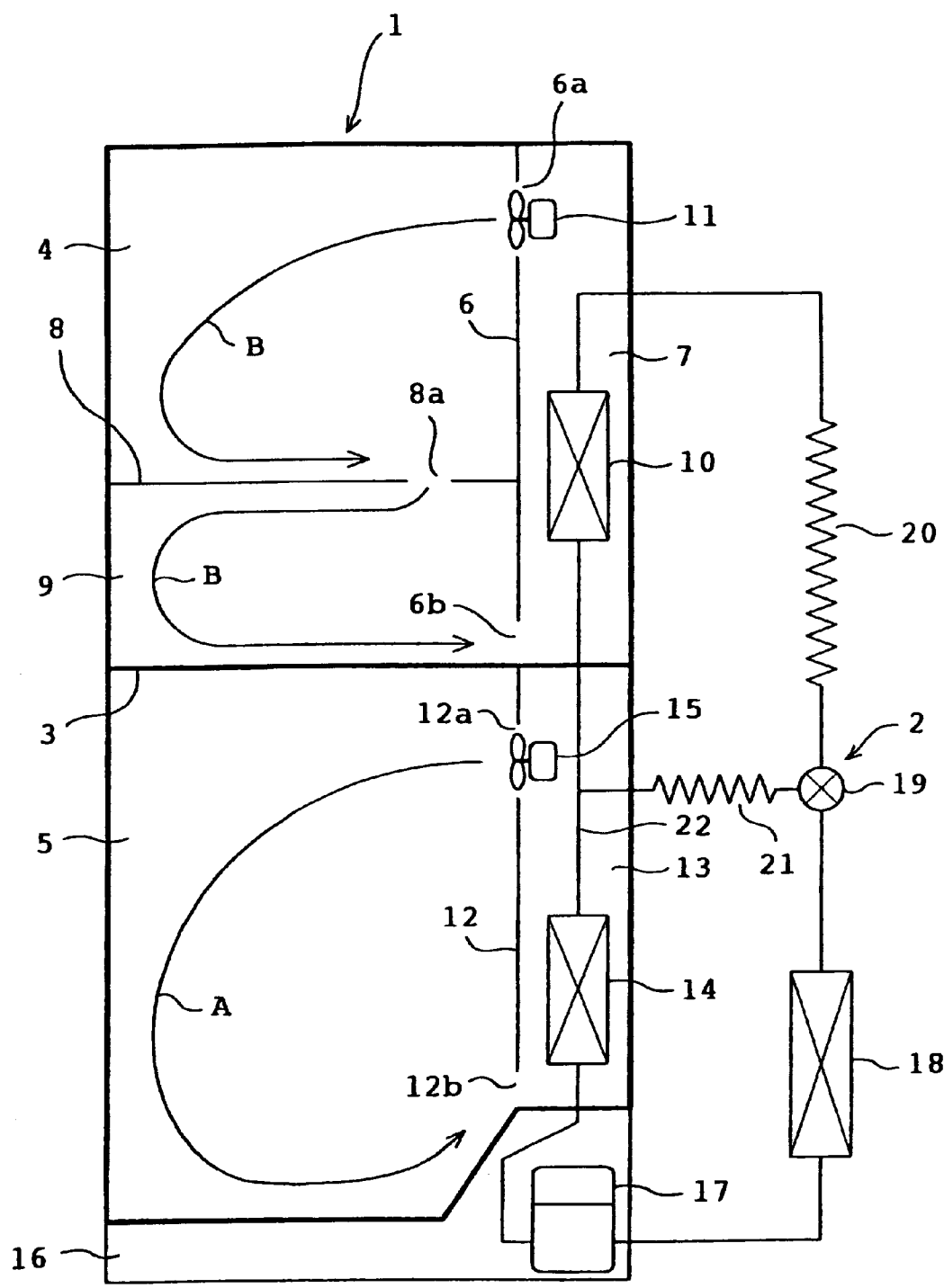
FIG. 1 is a schematic illustration of a body and a refrigerating cycle of the refrigerator-freezer of one embodiment in accordance with the present invention.

One embodiment of the present invention will be described with reference to the drawings. Referring to FIG. 1, a body 1 of the refrigerator-freezer in accordance with the invention and a refrigerating cycle 2 are shown. The body 1 of the refrigerator-freezer comprises a heat-insulating box. An interior of the body 1 is partitioned by a heat-insulating partition wall 3 to an upper refrigerating compartment 4 and a lower freezing compartment 5. A partition plate 6 is provided in the rear interior of the refrigerating compartment 4 to define a duct 7. Another partition plate 8 is also provided in the lower interior of the refrigerating compartment 4 to define a vegetable compartment 9. A first evaporator 10 constituting the refrigerating cycle 2 is provided in the lower interior (an evaporator compartment) of the duct 7 for cooling an atmosphere in the refrigerating compartment 4. The partition plate 6 has an air outlet 6a formed through an upper portion thereof. A first blower 11 is provided in the air outlet 6a in the duct 7 for supplying a cold air into the refrigerating compartment 4. The partition plate 6 has an air inlet 6b formed through a lower portion thereof so that the vegetable compartment 9 communicates with the duct 7 therethrough. The partition plate 8 has a communicating hole 8a through which the refrigerating compartment 4 communicates with the vegetable compartment 9.

A partition plate 12 is provided in the rear interior of the freezing compartment 5 to define a duct 13. A second evaporator 14 constituting the refrigerating cycle 2 is provided in the lower interior (an evaporator compartment) of the duct 13 for cooling an atmosphere in the freezing compartment 5. The partition plate 12 has an air outlet 12a formed through an upper portion thereof. A second blower 15 is provided in the air outlet 12a in the duct 13 for supplying a cold air into the freezing compartment 5. The partition plate 12 has an air inlet 12b formed through a lower portion thereof so that the freezing compartment 5 communicates with the duct 13 therethrough. A machine compartment 16 is defined in a lower interior of the body 1. A compressor 17 constituting the refrigerating cycle 2 is provided in the rear interior of the machine compartment 16. A blower (not shown) is provided in the machine compartment 16 for cooling the compressor 17 etc.

The refrigerating cycle 2 further includes a condenser 18, a three-way switching valve 19 serving as a valve, and two capillary tubes 20 and 21 as well as the first and second evaporators 10 and 14 and the compressor 17. The compressor 17 has an outlet communicating via the condenser 18 with an inlet of the switching valve 19. The switching valve 19 has one of two outlets communicating with an inlet of the compressor 17 via the capillary tube 20, the first evaporator 10, a connecting pipe 22 and the second evaporator 14. The switching valve 19 has the other outlet communicating via the capillary tube 21 with a middle portion of the capillary tube 22. The condenser 18 and the switching valve 19 both shown in FIG. 1 are disposed in the machine compartment 16. The capillary tube 20 for the first evaporator 10 is embedded in urethane foam filling the interior of the heat-insulating box of the body 1 to be connected to the first evaporator. The capillary tube 21 for the second evaporator 14 is also embedded in the urethane foam to be connected to the second evaporator.

Figure 2:
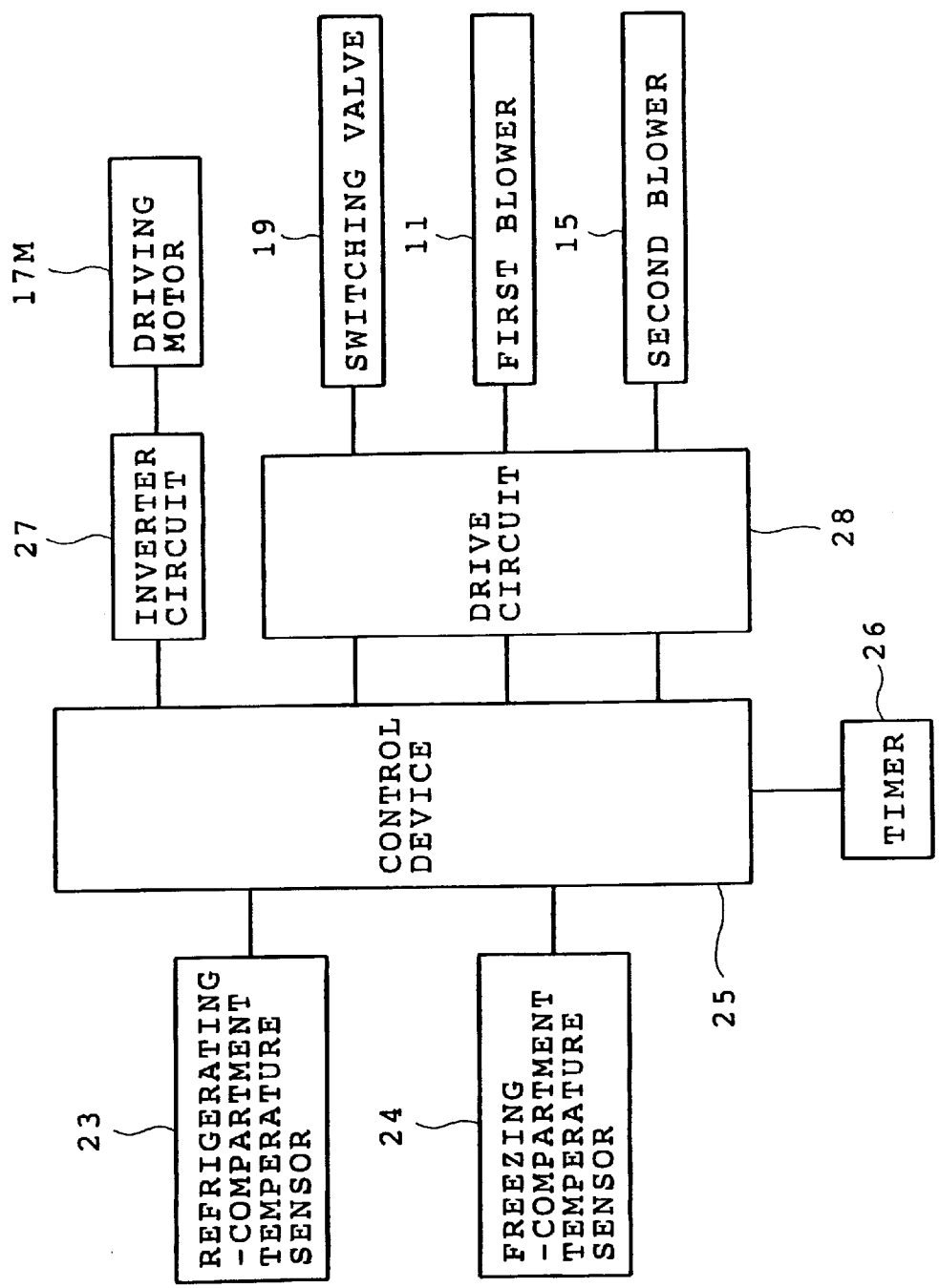
FIG. 2 is a block diagram showing an electrical arrangement of the refrigerator-freezer.

Referring now to FIG. 2, an electrical arrangement of the refrigerator-freezer is schematically shown. A first temperature sensor 23 senses a temperature in the refrigerating compartment 4 and comprises a thermistor. A second temperature sensor 24 senses a temperature in the freezing compartment 5 and also comprises a thermistor. These temperature sensors 23 and 24 are connected to input ports of a control device 25 serving as a controller respectively. The control device 25 is mainly composed of a microcomputer and has an input port and an output port both connected to output and input terminals of a timer 26 respectively. The control device 25 further has another output port connected via an inverter circuit 27 to a driving motor 17M. The control device 25 further has a plurality of output ports connected via a drive circuit 28 to the switching valve 19, the first blower 11, the second blower 15 and the blower (not shown) for cooling the interior of the machine compartment 16 respectively.

The control device 25 inputs signals from the first and second temperature sensors 23 and 24 to thereby detect the temperatures TR and TF in the refrigerating and freezing compartments 4 and 5 respectively. The control device 25 controls via the inverter circuit 27 a rotational speed N of the driving motor 17M so that the speed N is varied (variable speed control), whereupon the control device 25 controls the compressor 17 so that a performance of the compressor is varied. Further, the control device 25 controls the switching valve 19. In this case, refrigerant is supplied to the first evaporator 4 and also via the connecting pipe 22 to the second evaporator 14 when the switching valve 19 is switched so that refrigerant supplied from the condenser 18 is further supplied only to the capillary tube 20 side, that is, so that the atmosphere in the refrigerating compartment 4 is cooled. Consequently, the cooling operation is switched to a first operation mode in which the atmosphere in the refrigerating compartment 4 is cooled. On the other hand, the refrigerant is supplied to the second evaporator 14 when the switching valve 19 is switched so that the refrigerant supplied from the condenser 18 is further supplied only to the capillary tube 21 side, that is, so that the atmosphere in the freezing compartment 5 is cooled. Consequently, the cooling operation is switched to a second operation mode in which the atmosphere in the freezing compartment 5 is cooled.

The control device 25 further controls fan motors (not shown) of the first and second blowers 11 and 15 and the blower for cooling the interior of the machine compartment respectively individually. In this case, it is preferred that rotational speeds of the fan motors or the blowing capacity of each blower is controlled so as to be varied (variable speed control).

Figure 3:
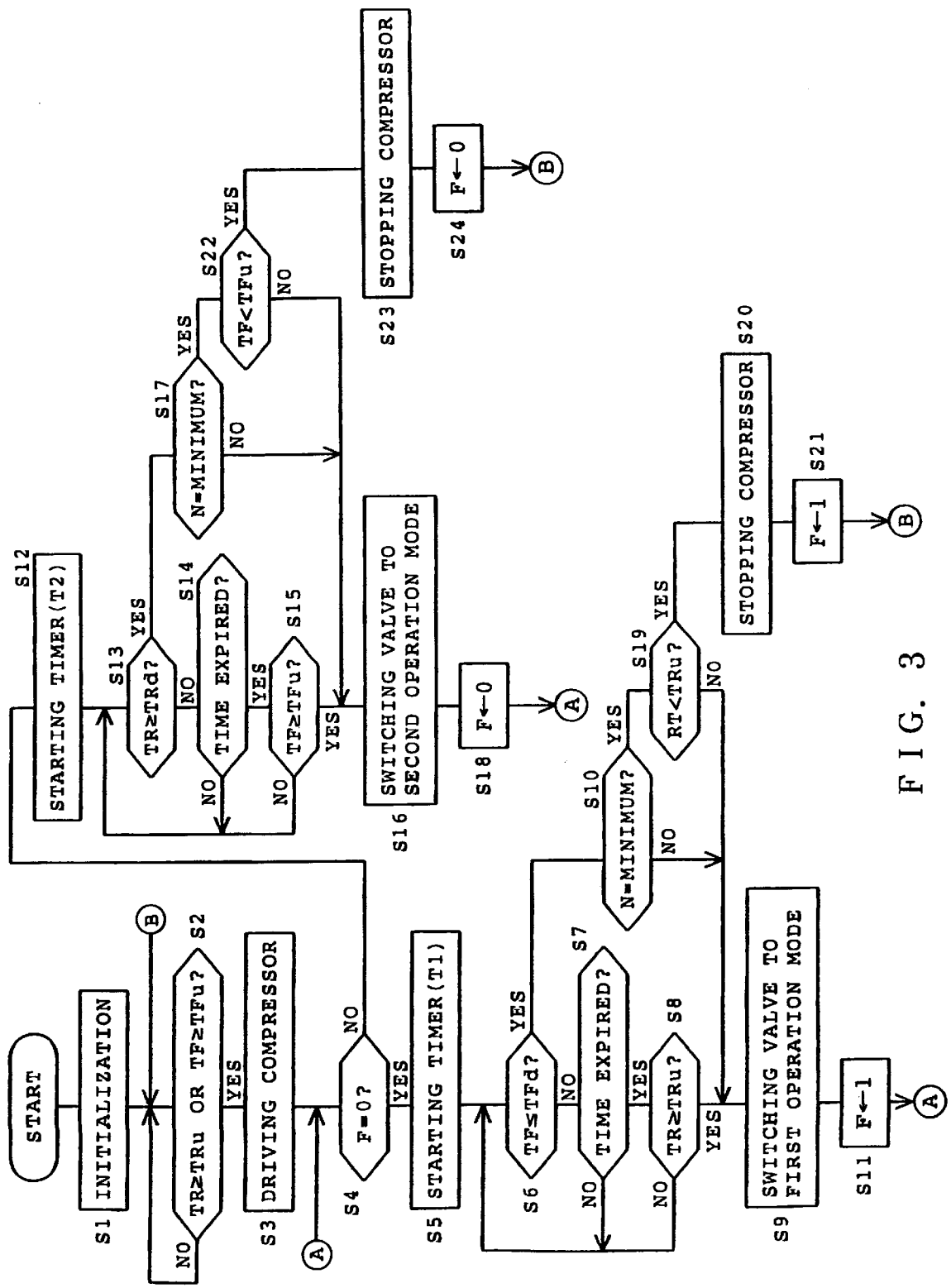
FIG. 3 is a flowchart showing a control manner of a controller.

The operation of the refrigerator-freezer will now be described with reference to FIG. 3. The control device 25 starts when electric power is supplied thereto. First, the control device 25 carries out an initializing process at step S1. The control device 25 carries out the following processes in addition to a predetermined initializing process. That is, the control device 25 obtains the difference $\Delta F$ ($=TF-TFu$) between the current temperature TF in the freezing compartment 5 and a predetermined upper limit temperature TFu (for example, $-18°$ C.) for the freezing compartment 5. The control device 25 also obtains the difference $\Delta R$ between the current temperature TR in the refrigerating compartment 4 and a predetermined upper limit temperature TRu (for example, $5°$ C.) for the refrigerating compartment 4. The control device 25 then compares the obtained differences $\Delta F$ and $\Delta R$. When the difference $\Delta F$ is equal to or larger than the difference $\Delta R$ ($\Delta F \geq \Delta R$), the switching valve 19 is switched so that the cooling operation is switched to the second operation mode in which the atmosphere in the freezing compartment 5 is cooled. Further, a flag F is reset to "0." Otherwise, the control device 25 switches the switching valve 19 so that the cooling operation is switched to the first operation mode in which the atmosphere in the refrigerating compartment 4 is cooled, setting the flag F for "1."

In the comparison of the differences ΔF and ΔR, when both differences take positive values respectively, the difference taking a larger value is larger than the difference taking a smaller value. When one difference takes a positive value and the other takes a negative value, the difference taking the positive value is larger than the difference taking the negative value. When both differences take negative values respectively, the difference taking a smaller absolute value is larger than the difference taking a larger absolute value. For the sake of simplicity in the description, assume now that the difference ΔF is larger and the switching valve 19 is switched to the second operation mode so that the atmosphere in the freezing compartment 5 is cooled. Further assume that the flag F is reset to "0."

The control device 25 then advances to step S2 to determine whether the temperature in the refrigerating compartment 4 is equal to or above the upper limit temperature or whether the temperature in the freezing compartment 5 is equal to or above the upper limit temperature (TR≧TRu or TF≧TFu?). The determination at step S2 is repeated when the control device 25 determined in the negative. When determining in the affirmative at step S2, the control device 25 advances to step S3 to energize via the inverter circuit 27 the driving motor 17M so that the compressor 17 is driven.

Upon drive of the compressor 17, the refrigerant compressed by the compressor is condensed by the condenser 18 to be supplied to the switching valve 19. Since the switching valve 19 is switched to the second operation mode, the refrigerant from the switching valve 19 is supplied via the capillary tube 21 only to the second evaporator 14. The refrigerant is evaporated by the second evaporator 14 and is thereafter returned to the compressor 17. The control device 25 starts the second blower 15 when the switching valve 19 is switched to the second operation mode. The blowing operation of the second blower 15 causes the cold air produced by the second evaporator 14 to flow through the air outlet 12a of the duct 13 into the freezing compartment 5 as shown by arrow A in FIG. 1. The cold air then flows downward in the freezing compartment 5 to be drawn into the inlet 12b, so that the atmosphere in the freezing compartment 5 is cooled.

The control device 25 then advances to step S4 to determine whether the flag F is set for "0" or whether the switching valve 19 is in the second operation mode. The control device 25 determines in the affirmative at step S4, advancing to step S5. At step S5, the control device 25 starts a timer 26 so that a set time T1 (for example, 15 minutes) for the cooling of the atmosphere in the freezing compartment 5 is timed. The control device 25 then advances to step S6 to determine whether the temperature in the freezing compartment 5 has dropped to or below a predetermined lower limit temperature TFd (for example, −22° C.) for the freezing compartment 5. In the embodiment, the control device 25 determines in the negative at step S6, advancing to step S7. The control device 25 determines at step S7 whether the timer 26 has finished the timing operation. When determining in the negative at step S7, the control device 25 returns to step S6, repeating the steps S6 and S7 alternately.

Thereafter, the control device 25 determines in the affirmative at step S7 when the timer 26 finishes the timing operation with respect to the set time T1 while the control device is repeating steps S6 and S7. The control device 25 then advances to step S8 to determine whether the temperature in the refrigerating compartment 4 for which the cooling operation is unexecuted is equal to or above the upper limit temperature (TR≧TRu?). When determining in the negative at step S8, the control device 25 returns to step S6, repeating the steps S6, S7 and S8 sequentially. When determining in the affirmative at step S8, the control device 25 advances to step S9 to switch the switching valve 19. The control device 25 determines in the affirmative at step S6 when the temperature TF in the freezing compartment 5 drops to or below the lower limit temperature TFd while the steps S6 and S7 are being repeated alternately or while the steps S6, S7 and S8 are being repeated sequentially. The control device 25 then advances to step S10.

The control device 25 sequentially calculates and monitors a change rate of the dropping temperature TF in the freezing compartment 5 during the cooling operation for the freezing compartment. The control device 25 controls the inverter circuit 27 so that the speed N of the driving motor 17M of the compressor 17 is reduced with an increase in the calculated change rate. When the change rate of the dropping temperature TF is large, the cooling performance of the compressor 17 is high, that is, the load of the freezing compartment 5 is small. Accordingly, the performance of the compressor 17 is reduced for energy saving in such a case.

The control device 25 then determines at step S10 whether the speed N of the driving motor 17M is minimum, namely, whether the performance of the compressor 17 is lowest. When determining in the negative at step S10, the control device 25 advances to step S9. At step S9, the control device 25 switches the switching valve 19 so that the cooling operation is performed for the refrigerating compartment 4. The control device 25 then advances to step S11 to set the flag F for "1." When the switching valve 19 is switched so that the cooling operation is performed for the refrigerating compartment 4, the control device 25 stops the operation of the second blower 15 and starts the operation of the first blower 11. When the switching valve 19 has been switched so that the cooling operation is performed for the refrigerating compartment 5, the refrigerant supplied to the switching valve 19 is further supplied via the capillary tube 20 to the first evaporator 10, so that most of the refrigerant is evaporated by the first evaporator. The residual refrigerant is supplied via the connecting pipe 22 to the second evaporator 14 to thereby be evaporated. By the blowing operation of the first blower 11, the cold air from the first evaporator 10 is supplied via the air outlet 6a into the refrigerating compartment 4. The cold air supplied into the refrigerating compartment 4 is circulated downward therein as shown by arrow B in FIG. 1 and thereafter supplied via the communicating hole 8a into the vegetable compartment 9. The cold air is drawn through the air inlet 6b into the duct 7.

After executing step S11, the control device 25 advances to step S4 where the control device determines in the negative, advancing to step S12. At step S12, the control device 25 starts the timer 26 so that a set time T2 (for example, 10 minutes) for the cooling of the atmosphere in the refrigerating compartment 4 is timed. The control device 25 then advances to step S13 to determine whether the temperature TR in the refrigerating compartment 4 for which the cooling operation is in progress has dropped to or below the lower limit temperature TRd (for example, 1° C.) for the refrigerating compartment 4. In the embodiment, the control device 25 determines in the negative at step S13, advancing to step S14. The control device 25 determines at step S14 whether the timer 26 has finished the timing operation. When determining in the negative at step S14, the control device 25 returns to step S13, repeating the steps S13 and S14 alternately.

The control device 25 determines in the affirmative at step S14 when the timer 26 finishes the timing operation with respect to the set time T2 while the control device is repeating the steps S13 and S14. The control device 25 then advances to step S15 to determine whether the temperature TF in the freezing compartment 5 for which the cooling operation is unexecuted is equal to or above the upper limit temperature TFu (TF≧TFu?). When determining in the negative at step S15, the control device 25 returns to step S13, repeating the steps S13, S14 and S15 sequentially. When determining in the affirmative at step S15, the control device 25 advances to step S16 to switch the switching valve 19. Further, the control device 25 determines in the affirmative at step S13 when the temperature TR in the refrigerating compartment 4 drops to or below the lower limit temperature TRd while the steps S13 and S14 are being repeated alternately or while the steps S13, S14 and S15 are being repeated sequentially. The control device 25 then advances to step S17.

The control device 25 sequentially calculates and monitors a change rate of the dropping temperature TR in the refrigerating compartment 4 during the cooling operation for the refrigerating compartment. The control device 25 controls the inverter circuit 27 so that the speed N of the driving motor 17M of the compressor 17 is reduced with an increase in the calculated change rate. When the change rate of the dropping temperature TR is large, the cooling performance of the compressor 17 is high, that is, the load of the refrigerating compartment 4 is small. Accordingly, the performance of the compressor 17 is reduced for energy saving in such a case.

The control device 25 then determines at step S17 whether the speed N of the driving motor 17M is minimum, namely, whether the performance of the compressor 17 is lowest. When determining in the negative at step S17, the control device 25 advances to step S16. At step S16, the control device 25 switches the switching valve 19 so that the cooling operation is performed for the freezing compartment 5. The control device 25 then advances to step S18 to reset the flag F to "0." When the switching valve 19 is switched so that the cooling operation is performed for the freezing compartment 5, the control device 25 starts the operation of the second blower 15 and continues the operation of the first blower 11 for a predetermined time, thereafter stopping the operation of the first blower. After execution of step S18, the control device 25 advances to step S4. When determining in the affirmative at step S4, the control device 25 advances to step S5, subsequently repeating the above-described control manner. As a result, the atmosphere in the freezing compartment 5 is cooled so that the temperature therein is maintained at a set temperature (for example, 3° C. on the average) for the refrigerating compartment 4, and the atmosphere in the freezing compartment 5 is cooled so that the temperature therein is maintained at a set temperature (for example, −20° C. on the average) for the freezing compartment 5.

The first blower 11 is continuously driven for the predetermined time even when the switching valve 19 has been switched so that the cooling operation is performed for the freezing compartment 5, as described above. The reason for this control manner is as follows. Dew condensation occurs on the first evaporator 10 due to moisture contained in food accommodated in the refrigerating compartment 4 and vegetables accommodated in the vegetable compartment 9.

When the first blower 11 is continuously driven even after the switching valve 19 has been switched, the dew on the first evaporator 10 is evaporated by the blowing operation of the first blower 11 such that the moisture is returned to the refrigerating and vegetable compartments 4 and 9. Consequently, since the humidity in each of the refrigerating and vegetable compartments 4 and 9 is increased, the food and particularly the vegetables can be prevented from being dried.

The cooling operation is performed for the freezing compartment 5 when the switching valve 19 has been switched as described above. The control device 25 advances to step S19 when determining in the affirmative at step S6 and further in the affirmative at step S10 during this cooling operation for the freezing compartment 5. At step S19, the control device 25 determines whether the temperature TR in the refrigerating compartment 4 for which the cooling operation is unexecuted is below the upper limit temperature TRu. The control device 25 advances to step S9 when determining in the negative at step S19. on the other hand, the control device 25 advances to step S20 when determining in the affirmative at step S19.

At step S20, the control device 25 stops the driving motor 17M to thereby stop the operation of the compressor 17 and further stops the operation of the second blower 15. The control device 25 then advances to step S21 to set the flag F for "1," returning to step S2. Accordingly, the compressor 17 remains stopped until the temperature TR in the refrigerating compartment 4 rises to or above the upper limit temperature TRu or the temperature TF in the freezing compartment 5 rises to or above the upper limit temperature TFu such that the control device 25 advances to step S3.

Further, the cooling operation is performed for the refrigerating compartment 4 when the switching valve 19 has been switched as described above. The control device 25 advances to step S22 when determining in the affirmative at step S13 and further in the affirmative at step S17 during this cooling operation for the refrigerating compartment 4. At step S22, the control device 25 determines whether the temperature TF in the freezing compartment 4 for which the cooling operation is unexecuted is below the upper limit temperature TFu. The control device 25 advances to step S16 when determining in the negative at step S22. On the other hand, the control device 25 advances to step S23 when determining in the affirmative at step S22.

At step S23, the control device 25 stops the driving motor 17M to thereby stop the operation of the compressor 17 and further stops the operation of the first blower 11 after the predetermined time of drive from the time of the switching of the switching valve 19. The control device 25 then advances to step S24 to reset the flag F to "0," returning to step S2.

According to the foregoing embodiment, the cooling operation for the freezing compartment 5 and the cooling operation for the refrigerating compartment 4 are alternately performed for the respective set times T1 and T2. When the temperature TF in the freezing compartment 5 drops to or below the lower limit temperature TFd during the cooling operation for the freezing compartment, the cooling operation is switched to that for the refrigerating compartment 4 even before the set time T1 expires. Further, even after the set time T1 expires, the cooling operation for the freezing compartment 5 is continued when the temperature TR in the refrigerating compartment 4 for which the cooling operation is unexecuted is below the upper limit temperature TRu and the temperature TF in the freezing compartment 5 is higher than the lower limit temperature TFd. Additionally, when the temperature TR in the refrigerating compartment 4 drops to or below the lower limit temperature TRd during the cooling operation for the refrigerating compartment, the cooling operation is switched to that for the freezing compartment 5 even before the set time T2 expires. Further, even after the set time T2 expires, the cooling operation for the refrigerating compartment 4 is continued when the temperature TF in the freezing compartment 5 for which the cooling operation is unexecuted is below the upper limit temperature TFu and the temperature TR in the refrigerating compartment 4 is higher than the lower limit temperature TRd. Accordingly, the compressor 17 is required to have such a cooling performance that only the atmosphere in the freezing compartment 5 is cooled in the cooling operation for the freezing compartment and that the atmosphere in the refrigerating compartment 4 is mainly cooled in the cooling operation for the refrigerating compartment. On the other hand, in the prior art, the compressor is required to have such a cooling performance as to simultaneously cool both of the refrigerating and freezing compartments. The size of the compressor 17 can be reduced as compared with that of the compressor used in the conventional refrigerator-freezer. As a result, the manufacturing cost of the refrigerator-freezer can be reduced and a high level of energy saving can be achieved.

The control device 25 sequentially calculates the change rates of the dropping temperatures TF and TR in the freezing and refrigerating compartments 5 and 4 during the cooling operation for the freezing and refrigerating compartments respectively. The control device 25 controls the inverter circuit 27 so that the speed N of the driving motor 17M of the compressor 17 is reduced with an increase in each calculated change rate. Accordingly, when the load of the freezing or refrigerating compartment 5 or 4 is small, the cooling performance of the compressor 17 can be lowered, whereupon further energy saving can be achieved.

The control device 25 stops the operation of the compressor 17 when the temperature TR or TF in the refrigerating or freezing compartment 4 or 5 for which the cooling operation is unexecuted is below the respective upper limit temperature TRd or TFd in a case where the temperature TF or TR in the freezing or refrigerating compartment 5 or 4 for which the cooling operation is in progress drops to or below the respective lower limit temperature TFd or TRd and the speed of the driving motor 17M of the compressor 17 is minimum during the cooling operation for the freezing or refrigerating compartment. Thus, when the operation of the compressor 17 is stopped, both of the temperatures TF and TR in the respective freezing and refrigerating compartments 5 and 4 are low and the cooling performance of the compressor 17 is minimum. Accordingly, an excessive increase in the temperature TF or TR in the respective freezing or refrigerating compartment 5 or 4 can reliably be prevented when the operation of the compressor 17 is stopped. Consequently, the operating efficiency of the compressor 17 can be improved such that the food can efficiently be cooled.

A modified form of the foregoing embodiment will now be described. Steps S17, S22, S23 and S24 in the flowchart of FIG. 3 are eliminated in the modified form. Further, the control device 25 advances to step S16 when determining in the affirmative at step S13. Accordingly, the operation of the compressor 17 is stopped only when the control device 25 determines in the affirmative in each of steps S6, S10 and S19 during the cooling operation for the freezing compartment 5. Thus, the operation of the compressor 17 is not stopped when the temperature TF in the freezing compartment 5 is not at or below the lower limit temperature TFd. Consequently, the atmosphere in the freezing compartment 5 can usually be maintained at a low temperature.

In the foregoing embodiment, either one or both of steps S10 and S17 may be eliminated, that is, the determination as to whether the speed of the driving motor 17M of the compressor 17 is minimum may be eliminated. Further, the performance of the compressor 17 is controlled to be varied in the foregoing embodiment. However, the compressor may be driven at a predetermined constant performance, instead. In this case, an operating performance of the compressor may be lower than that of the conventional compressor. Additionally, step S10 in the flowchart of FIG. 3 may be eliminated in the above-described modified form.

In the foregoing embodiment and the modified form thereof, the refrigerant from the switching valve 19 is supplied via the capillary tube 20 to a series passage of the first and second evaporators 10 and 14 during the cooling operation for the refrigerating compartment 4, as shown in FIG. 1. However, the refrigerant may be supplied via the capillary tube 20 only to the first evaporator 10 during the cooling operation for the refrigerating compartment 4, instead. Further, each of the first and second blowers 11 and 15 and machine compartment blower is driven at a predetermined blowing capacity. However, the blowing capacity of each blower may be controlled to be varied, instead. Additionally, although the vegetable compartment 19 is provided as shown in FIG. 1, it may or may not be provided.

The foregoing description and drawings are merely illustrative of the principles of the present invention and are not to be construed in a limiting sense. Various changes and modifications will become apparent to those of ordinary skill in the art. All such changes and modifications are seen to fall within the scope of the invention as defined by the appended claims.

We claim:

1. A refrigerator-freezer comprising:
   a refrigerating compartment;
   a freezing compartment;
   a refrigerating cycle including a compressor compressing a refrigerant, a condenser condensing the refrigerant supplied from the compressor, a first evaporator cooling an atmosphere in the refrigerating compartment, a second evaporator cooling an atmosphere in the freezing compartment, and a valve switching a cooling operation between a first operation mode in which the refrigerant compressed by the compressor is supplied at least to the first evaporator and a second operation mode in which the refrigerant compressed by the compressor is supplied at least to the second evaporator; and
   a controller controlling the compressor and the valve, the controller controlling the valve so that the first and second operation modes are carried out alternately, the controller stopping the operation of the compressor when a temperature in either one of the refrigerating and freezing compartments for which the cooling operation is unexecuted is below a predetermined upper limit temperature in a case where a temperature in the other compartment for which the cooling operation is in progress drops to a predetermined lower limit temperature.

2. A refrigerator-freezer according to claim 1, wherein the controller controls the compressor so that a performance of the compressor is varied, and the controller stops the operation of the compressor when the compressor is at a lowest performance and the temperature in the compartment for which the cooling operation is unexecuted is below the predetermined upper limit temperature in a case where the temperature in the compartment for which the cooling operation is in progress drops to the lower limit temperature.

3. A refrigerator-freezer according to claim 2, wherein the controller controls the compressor so that the performance of the compressor is reduced with an increase in a change rate of the dropping temperature in the compartment for which the cooling operation is in progress.

4. A refrigerator-freezer according to claim 2, wherein the controller switches the cooling operation to the second operation mode when a temperature in the refrigerating compartment drops to a predetermined lower limit temperature while the cooling operation is in progress in the first operation mode and thereafter, the controller stops the operation of the compressor when a temperature in the freezing compartment drops to a predetermined lower limit temperature and the temperature in the refrigerating compartment is below a predetermined upper limit temperature while the cooling operation is in progress in the second operation mode.

5. A refrigerator-freezer according to claim 2, wherein in a case where a temperature in either one of the refrigerating and freezing compartments for which the cooling operation is in progress is above a predetermined lower limit temperature, the controller switches the cooling operation when a predetermined time elapses from start of the cooling operation and a temperature in the other compartment for which the cooling operation is unexecuted is above a predetermined upper limit temperature.

6. A refrigerator-freezer according to claim 2, wherein the controller switches the cooling operation in a case where a temperature in either one of the refrigerating and freezing compartments for which the cooling operation is unexecuted is above a predetermined upper limit temperature when a temperature in the other compartment for which the cooling operation is in progress drops to a predetermined lower limit temperature.

7. A refrigerator-freezer according to claim 1, wherein the controller switches the cooling operation to the second operation mode when a temperature in the refrigerating compartment drops to a predetermined lower limit temperature while the cooling operation is in progress in the first operation mode and thereafter, the controller stops the operation of the compressor when a temperature in the freezing compartment drops to a predetermined lower limit temperature and the temperature in the refrigerating compartment is below a predetermined upper limit temperature while the cooling operation is in progress in the second operation mode.

8. A refrigerator-freezer according to claim 4, wherein in a case where a temperature in either one of the refrigerating and freezing compartments for which the cooling operation is in progress is above a predetermined lower limit temperature, the controller switches the cooling operation when a predetermined time elapses from start of the cooling operation and a temperature in the other compartment for which the cooling operation is unexecuted is above a predetermined upper limit temperature.

9. A refrigerator-freezer according to claim 4, wherein the controller switches the cooling operation in a case where a temperature in either one of the refrigerating and freezing compartments for which the cooling operation is unexecuted is above a predetermined upper limit temperature when a temperature in the other compartment for which the cooling operation is in progress drops to a predetermined lower limit temperature.

10. A refrigerator-freezer according to claim 1, wherein in a case where a temperature in either one of the refrigerating and freezing compartments for which the cooling operation is in progress is above a predetermined lower limit temperature, the controller switches the cooling operation when a predetermined time elapses from start of the cooling operation and a temperature in the other compartment for which the cooling operation is unexecuted is above a predetermined upper limit temperature.

11. A refrigerator-freezer according to claim 1, wherein the controller switches the cooling operation in a case where a temperature in either one of the refrigerating and freezing compartments for which the cooling operation is unexecuted is above a predetermined upper limit temperature when a temperature in the other compartment for which the cooling operation is in progress drops to a predetermined lower limit temperature.

* * * * *